(12) United States Patent
Viglione

(10) Patent No.: US 7,883,280 B2
(45) Date of Patent: Feb. 8, 2011

(54) SHUTTER ACTIVATION SYSTEM

(75) Inventor: David Viglione, Rochester, NY (US)

(73) Assignee: VA, Inc., Rochester, NY (US)

( * ) Notice: Subject to any disclaimer, the term of this patent is extended or adjusted under 35 U.S.C. 154(b) by 227 days.

(21) Appl. No.: 12/046,958

(22) Filed: Mar. 12, 2008

(65) Prior Publication Data

US 2009/0232488 A1 Sep. 17, 2009

(51) Int. Cl.
G03B 9/08 (2006.01)
(52) U.S. Cl. .................... 396/468; 396/463
(58) Field of Classification Search ........... 396/452, 396/453, 455, 463, 467, 468, 493, 508
See application file for complete search history.

(56) References Cited

U.S. PATENT DOCUMENTS

| | | | |
|---|---|---|---|
| 3,533,345 A | 10/1970 | Starp | |
| 3,595,553 A | 7/1971 | Vincent | |
| 3,664,251 A | 5/1972 | Vincent | |
| 3,804,506 A | 4/1974 | Fletcher et al. | |
| 4,051,499 A * | 9/1977 | Kondo | 396/464 |
| 4,060,313 A | 11/1977 | Kondo | |
| 4,121,235 A * | 10/1978 | Fujita et al. | 396/467 |
| 4,171,897 A | 10/1979 | Fujita et al. | |
| 4,265,530 A * | 5/1981 | Petersen | 396/256 |
| 4,302,090 A | 11/1981 | Kiuchi et al. | |
| 4,466,723 A | 8/1984 | Ikari et al. | |
| 4,702,583 A | 10/1987 | Yoshino et al. | |
| 4,724,452 A | 2/1988 | Mody et al. | |
| 4,772,904 A | 9/1988 | Otsuka et al. | |
| 4,881,093 A | 11/1989 | Dowe | |
| 4,972,217 A | 11/1990 | Gaewsky | |
| 5,117,137 A | 5/1992 | Kobayashi | |
| 5,135,089 A | 8/1992 | Kovac | |
| 5,173,728 A | 12/1992 | Sangregory et al. | |
| 5,262,812 A | 11/1993 | Fukasawa | |
| 5,337,110 A | 8/1994 | Dowe | |
| 5,489,959 A | 2/1996 | Akada | |
| 5,555,059 A | 9/1996 | Seo et al. | |

(Continued)

FOREIGN PATENT DOCUMENTS

GB 2235541 A * 3/1991

(Continued)

OTHER PUBLICATIONS

McLeod, et al.: Advanced electro-mechanical micro-shutters for thermal infrared night vision imaging and targeting systems, pp. 1-10.

(Continued)

*Primary Examiner*—W. B. Perkey
*Assistant Examiner*—Noam Reisner
(74) *Attorney, Agent, or Firm*—Dominic P. Ciminello, Esq.; Stephen B. Salai, Esq.; Harter Secrest & Emery LLP

(57) ABSTRACT

A shutter includes at least one shutter blade, a magnet moveably connected to the at least one shutter blade, and a solenoid defining a gap between a first pole and a second pole. The solenoid is configured to controllably draw the magnet into the gap in a first state and to controllably repel the magnet from the gap in a second state.

45 Claims, 7 Drawing Sheets

U.S. PATENT DOCUMENTS

| | | | |
|---|---|---|---|
| 5,705,873 | A | 1/1998 | Sato |
| 6,033,131 | A | 3/2000 | Ghosh et al. |
| 6,652,165 | B1 | 11/2003 | Pasquarella et al. |
| 6,700,114 | B2 | 3/2004 | Mizuno et al. |
| 6,714,733 | B2 | 3/2004 | Kobayashi |
| 6,806,985 | B1 | 10/2004 | Devenyi |
| 7,104,707 | B2 | 9/2006 | Miyawaki |
| 7,259,922 | B2 | 8/2007 | Fukasawa |
| 2002/0060640 | A1 | 5/2002 | Davis et al. |
| 2003/0062788 | A1 | 4/2003 | Aoshima |
| 2004/0008425 | A1 | 1/2004 | Miyawski |
| 2004/0258405 | A1 | 12/2004 | Shiratori et al. |
| 2005/0025478 | A1 | 2/2005 | Fujinaga |
| 2005/0041137 | A1 | 2/2005 | Ezawa et al. |
| 2007/0110432 | A1 | 5/2007 | Viglione et al. |

FOREIGN PATENT DOCUMENTS

| | | | |
|---|---|---|---|
| WO | WO 2007/089589 | A2 | 8/2007 |

OTHER PUBLICATIONS

Mulles Griot Custom Shutters, www.mellesgriot.com, pp. 1-2.
PCT-Notification of Transmittal of the International Search Report and the Written Opinion of the International Searching Authority, or the Declaration; mailed Jan. 4, 2010.
PCT—International Search Report issued in corresponding International Application No. PCT/US2009/036872 (3 pages).
PCT—Writtem Opinion of the International Searching Authority issued in corresponding International Application No. PCT/US2009/036872 (5 pages).
Melexis: MLX90318 Rotary Position Sensor IC, 3 pages www.melexis.com/Sensor_ICs_Hall_effect/Triaxis_Hall_ICs/MLX90316_566.aspx.
Office Action in corresponding Chinese Patent Application No. 200680050297.6, along with an English language Summary of the Office Action, (7 pages).
Supplementary European Search Report from European Patent Application No. EP 06839850.2, dated Jun. 8, 2009.
International Search Report and Written Opinion dated Mar. 28, 2008 re International Application No. PCT/US06/60186 filed Nov. 12, 2006—8 pages.
Rogers Corporation: PORON® Cellular Urethane Foams, Publ. #17-034, Oct. 1999 (2 pages).
USPTO Office Action in corresponding U.S. Appl. No. 12/359,869; mailed Aug. 24, 2010 (36 pages).
PCT—Notification Concerning Transmittal of Copy of International Preliminary Report on Patentability (1 page) mailed Sep. 23, 2010.
PCT—International Preliminary Report on Patentability, issued Sep. 14, 2010, including copy of Written Opinion of the International Searching Authority, mailed Jan. 4, 2010 (6 pages).

* cited by examiner

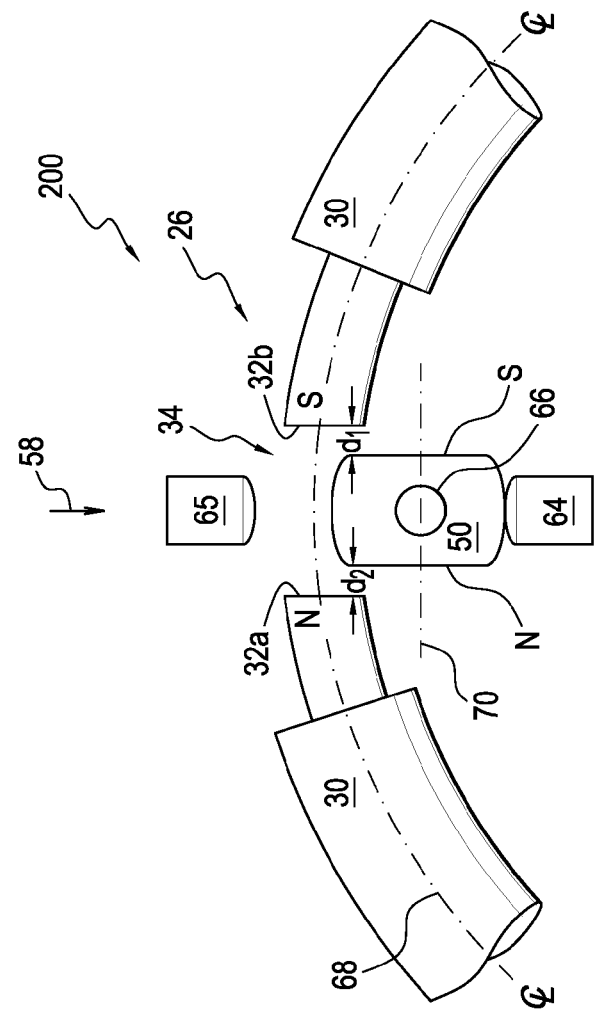
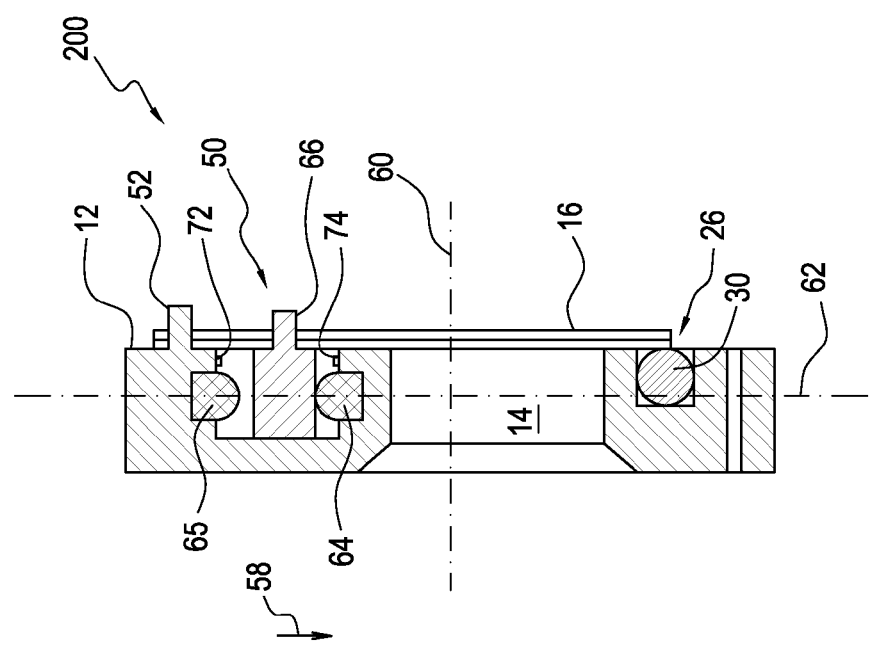

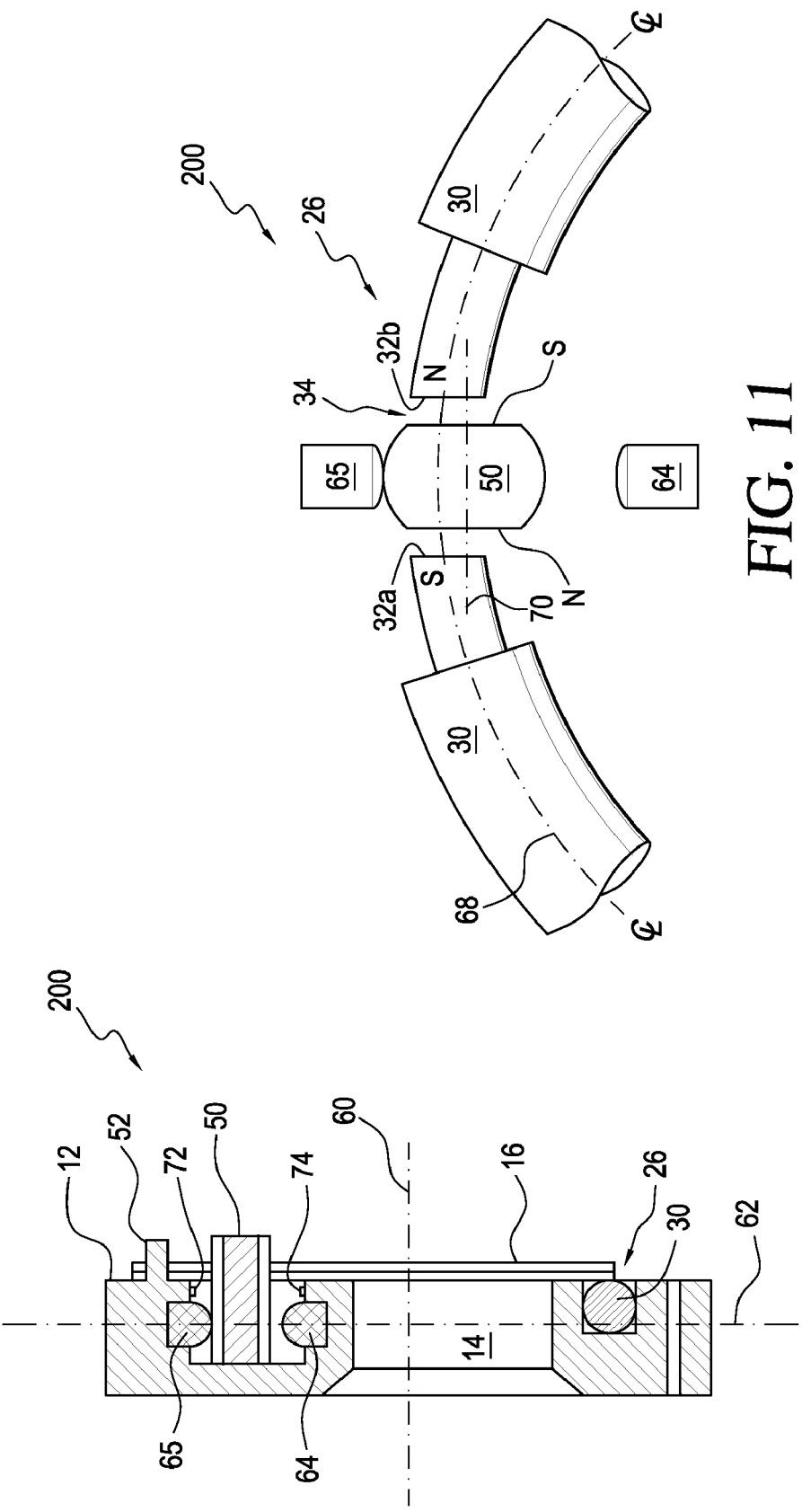

SHUTTER ACTIVATION SYSTEM

BACKGROUND OF THE INVENTION

1. Field of the Invention

The present invention relates generally to shutter assemblies and more particularly to photographic-type shutter assemblies that rely on electromagnetic forces to open and close.

2. Description of Related Art

Electrically operated lens shutters used in various types of photographic and laboratory equipment are well known in the art. Lens shutters especially adapted for high speed opening and closing can operate in fractions of a second. An open/close cycle can take place in 30-40 milliseconds or less and repeated cycles at frequencies of 30 cycles per second are common.

Lens shutters generally are of two types. In one type, a so-called "guillotine" shutter has one or two thin, metal blades or leaves arranged to cover a lens opening. Pivot connections allow each blade to swing between a closed position where the blades cover the lens opening and an open position where the blades are drawn aside from the lens opening.

In a second type of shutter, a plurality of pivotally mounted blades are arranged around the lens opening. Each blade is connected to a rotatable drive ring. In the operation of these shutters, the rotation of the drive ring in one direction causes the blades to swing in unison to an open position. Counter rotation of the ring swings the blades to a closed position over the lens opening after exposure. Generally a linear electric motor is used to activate the shutter. When activated, the linear motor pulls on a lever arm that rotates the drive ring to open the shutter. To close the shutter the motor is deactivated and a spring causes the counter rotation of the drive ring to close the shutter. As noted above, shutters of this sort can cycle open and close 30 times per second.

In some applications, however, space is limited. Space limitations, particularly in the region of the shutter opening, dictate the parameters of size and placement of components for opening and closing the shutter. For example, components placed near the shutter opening must have a relatively low profile so as not to interfere with the cone angle of the light passing through the open shutter. Space limitations also complicate the substitution of one shutter assembly for another as in changing shutter size while maintaining the same base structure.

As noted above, existing shutter assemblies typically mechanically couple a linear electric motor to the shutter for opening and closing the lens opening. However, for proper operation, particularly at high speeds, the mechanical linkage must be precisely made and the movement of the linkage must be dampened by relatively large dampening assemblies.

Alternatively, other known shutter assemblies may utilize electromagnetic energy to open and close the shutter. For example, such assemblies may include a permanent magnet disposed on a drive ring and a pair of spaced solenoids disposed above the permanent magnet. A polarity of an operative end of the first solenoid can be opposite that of an operative end of the second solenoid, such that the permanent magnet is attracted to one of the solenoids and repelled by the other. The solenoids can be energized to switch polarities, to effectuate a movement of the permanent magnet between a first position proximate the first solenoid and a second position proximate the second solenoid.

Such assemblies may be configured to open and close shutters at relatively high speeds without damaging the shutter blades. However, such assemblies generally require that the solenoid be situated in a tier or layer of the shutter assembly separate from, and either above or below, the permanent magnet. This necessarily increases the overall thickness of the shutter assembly.

Accordingly, the disclosed system and method are directed towards overcoming one or more of the problems set forth above.

BRIEF SUMMARY OF THE INVENTION

In an exemplary embodiment of the present disclosure, a shutter includes at least one shutter blade, a magnet moveably connected to the at least one shutter blade, and a solenoid defining a gap between a first pole and a second pole. The solenoid is configured to controllably draw the magnet into the gap in a first state and to controllably repel the magnet from the gap in a second state.

In another exemplary embodiment of the present disclosure, a shutter includes a plurality of shutter blades moveable between an open position and a closed position, a magnet moveably connected to each shutter blade of the plurality of shutter blades, and a solenoid having a first face defining a first pole, and a second face facing the first face and defining a second pole. The first and second faces lie in a plane substantially parallel to the plurality of shutter blades and the solenoid defines a central axis perpendicular to the plane. The magnet is configured to move in a path coplanar with the solenoid and substantially perpendicular to the central axis in response to a polarity of at least one of the first and second poles.

In a further exemplary embodiment of the present disclosure, a method of controlling a shutter includes drawing a portion of a magnet into a gap defined by first and second poles of a solenoid. Drawing the portion of the magnet into the gap causes a plurality of shutter blades moveably connected to the magnet to move to an open position. The method also includes repelling the portion of the magnet from the gap. Repelling the portion of the magnet from the gap causes the plurality of shutter blades to move to a closed position.

BRIEF DESCRIPTION OF THE SEVERAL VIEWS OF THE DRAWINGS

FIG. 8 is a cross-sectional view of the shutter illustrated in FIG. 7.

FIG. 9 shows a portion of the shutter illustrated in FIG. 7 with portions removed.

FIG. 10 is a cross-sectional view of a shutter according to another exemplary embodiment of the present disclosure.

FIG. 11 is shows a portion of the shutter illustrated in FIG. 10 with portions removed.

DETAILED DESCRIPTION OF THE INVENTION

Figure 1:
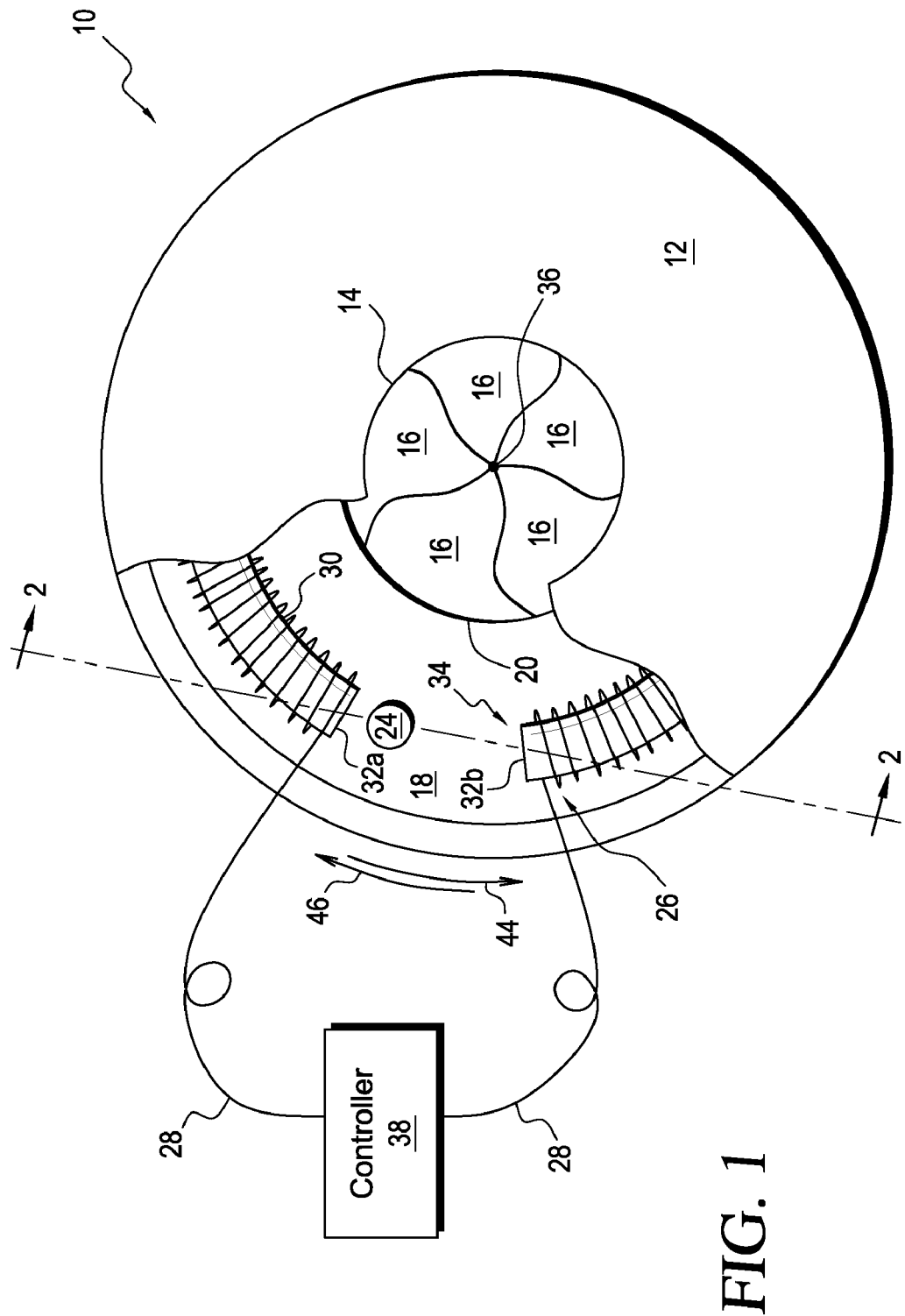
FIG. 1 is a plan view of a shutter, with portions removed, according to an exemplary embodiment of the present disclosure with portions removed.

FIG. 1 shows a shutter 10 according to an exemplary embodiment of the present disclosure. The shutter 10 is a type that can be used in any photographic, scientific or calibration application that requires one or more cycles of opening and closing of a shutter opening by driving one or more shutter blades across an opening.

The shutter 10 includes a base plate 12 defining a shutter opening 14. In an exemplary embodiment, the shutter opening 14 is a circular aperture having a central axis 36. Light is selectively occluded from passing through and is allowed to pass through the shutter opening 14 by moving a plurality of shutter blades 16 (usually five) in a pivoting action across the shutter opening 14. The shutter blades 16 preferably all move in a single shutter plane, which is normal to the central axis 36 of the shutter opening 14. In prior art shutters, the shutter blades are operated by a linear motor mounted to the base plate. The motor acts through a mechanical linkage to rotate a driver plate or drive ring, wherein the rotation of the driver plate in a to-and-fro motion acts to move the shutter blades to selectively reveal and cover the shutter opening.

An exemplary shutter 10 of the present disclosure also uses a drive ring 18 such as those conventionally used. A portion of the drive ring 18 is seen in FIG. 1 through the removed portion of the base plate 12. The drive ring 18 has an opening 20 that aligns with the shutter opening 14 so as not to impinge on the shutter opening. Extending from the drive ring are pins (not shown) that extend into a corresponding cam slot (not shown) formed in each of the shutter blades 16. With this arrangement, the rotation of the drive ring 18 to and fro about a drive ring rotational axis that is co-linear with the central axis 36 of the lens opening 14 will cause the shutter blades 16 to pivot between open and closed positions. The closed position is shown in FIG. 1.

As also shown in FIG. 1, the shutter 10 includes a permanent magnet 24 in communication with the drive ring 18, and a solenoid 26 arranged proximate the permanent magnet 24. The permanent magnet 24 and the solenoid 26 preferably cooperate to actuate the drive ring 18 about the drive ring rotational axis discussed above.

The solenoid 26 generally is made up of a wire 28 wound about a core 30. In the exemplary embodiment illustrated in FIG. 1, the solenoid 26 is generally arcuate and has an inner diameter larger than the diameter of the shutter opening. Accordingly, the solenoid 26 can be disposed in the shutter 10 about the shutter opening 14 without interfering with the shutter opening 14. In an exemplary embodiment of the present disclosure, the solenoid 26 can be substantially C-shaped and may span more than about 270-degrees of rotation about the central axis 36. The substantial C-shape terminates at operative faces 32a, 32b. The operative faces 32a, 32b are spaced by a gap 34 because the solenoid 26 does not form a complete circle around the shutter opening 36. At least a portion of the permanent magnet 24 preferably is disposed in the gap 34 between the first and second operative faces 32a, 32b. Ends of the wire 28 forming the solenoid 26 are disposed as leads proximate the first and second operative faces 32a, 32b, and the leads are connected to a solenoid driver 38. When the driver 38 applies a current to the solenoid 26 via the wire 28, the operative faces 32a, 32b become oppositely polarized. More specifically, when a first current is applied to the solenoid 26, the first operative face 32a takes on a first polarity, i.e., a north or south polarity, and the second operative face 32b takes on an opposite polarity.

Figure 2:
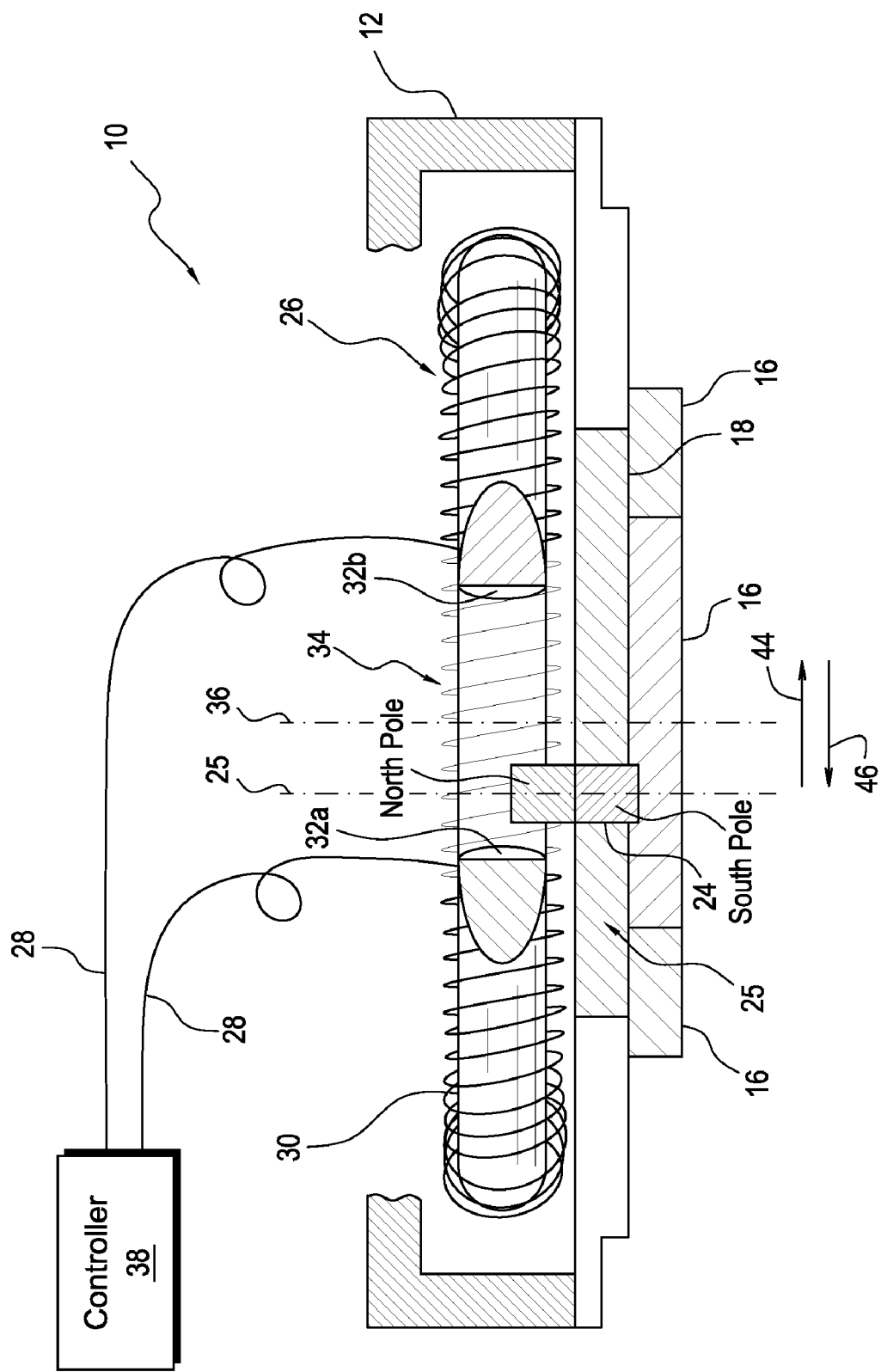
FIG. 2 is a cross-sectional view of the shutter of FIG. 1, as seen from section line 2-2 in FIG. 1.

The permanent magnet 24 preferably is mounted to the drive ring 18, and at least a portion of the magnet 24 preferably is disposed in the gap 34 formed between the first and second operative faces 32a, 32b of the solenoid 26. As illustrated in FIG. 2, the permanent magnet 24 is arranged with its polar axis 25, i.e., the axis through both the first and second poles of the permanent magnet 24, substantially parallel to the central axis 36. In the illustrated exemplary embodiment, the north pole of the magnet 24 is arranged above the south pole, and the north pole is disposed in the gap 34 between the first and second operative faces 32a, 32b of the solenoid 26. The south pole may be disposed away from the gap 34, below the solenoid 26.

In operation and with the shutter 10 in a closed position as shown in FIGS. 1 and 2, the magnet 24 may be attracted to and may be generally aligned adjacent the first operative face 32a. When a first current is applied to the solenoid 26, a north pole is created at the first operative face 32a of the solenoid 26 and a south pole is created at the second operative face 32b. Because the north pole of the permanent magnet 24 is disposed between the operative faces 32a, 32b of the solenoid 26, the magnet 24 will be repelled by the first operative face 32a, and will be attracted by the second operative face 32b, thereby moving from a position proximate the first operative face 32a to a position proximate the second operative face 32b. Such movement is illustrated by arrow 44. Because the permanent magnet 24 is connected to the drive ring 18, movement of the magnet 24 drives the drive ring 18 about the drive ring rotation axis to open the shutter blades 16. Once the shutter blades 16 open, light is permitted to pass through the shutter opening 14.

De-energizing the solenoid 26 will allow the shutter blades 16 to remain in an open position until the current applied to the solenoid 26 is reversed because the permanent magnet 24 will continue to be attracted to the second operative face 32b. Accordingly, to close the shutter blades 16, and thereby occlude light through the shutter opening 14, the driver 38 can be operated to reverse the polarity of the solenoid 26. Reversing the polarity may form a north pole at the second operative face 32b, thereby repelling the permanent magnet 24 away from the second operative face 32b. Reversing the polarity may also form a south pole at the first operative face 32a and may attract the permanent magnet 24 thereto. Movement of the magnet from the second operative face 32b to the first operative face 32a is illustrated by arrow 46.

As should be understood, delaying the reversal of the current will allow the shutter 10 to remain in the open position for the time of the delay. Conversely, reversing the current soon after opening will cause the shutter 10 to open and close quickly.

In an exemplary embodiment to the present disclosure, the motion of the drive ring 18 may be stopped when the permanent magnet 24 contacts one of the first and second operative faces 32a, 32b of the solenoid 26. Appropriate sizing of the gap 34 and of the permanent magnet 24 will ensure that contact prevents over-rotation of the drive ring 18 past the fully-closed or the fully-open positions of the shutter blades 16. Alternatively, the shutter 10 may include other mechanical stops or abutting surfaces that stop rotation of the drive ring 18.

The shutter 10 may also include a damper to avoid slamming of components into each other. For example, when the permanent magnet 24 is to be moved between the open and closed positions, the movement of the permanent magnet 24 could be slowed by alternating the current applied to the solenoid 26, for example, to alternately attract and repel the permanent magnet 24 as it approaches one of the operative faces 32a, 32b. For example, as the magnet 24 is about to contact one of the operative faces 32a, 32b, a pulse could be applied to the solenoid 26 to repel the permanent magnet 24 to slow the movement of the permanent magnet 24, thereby acting on the permanent magnet 24 as a magnetic brake.

As discussed above, the shutter 10 may be configured such that the north pole of the magnet 24 is disposed in the gap 34. In an additional exemplary embodiment of the present disclosure, however, the magnet 24 could be inverted such that the south pole of the magnet 24 is disposed in the gap 34 and the north pole of the magnet 24 is spaced either above or below the gap 34. In such an exemplary embodiment, however, because the operative faces 32a, 32b of the solenoid 26 may be controlled to have opposite polarities, only one pole of the magnet 24 may be disposed in the gap 34 between the operative faces 32a, 32b of the solenoid 26 so that each operative face 32a, 32b "sees" the same polarity of the magnet 24. In addition, in each of the embodiments discussed above, the solenoid 26 may be disposed on a first surface of the drive ring 18, and the shutter blades 16 may be disposed on a second, oppositely-facing, surface of the drive ring 18. The permanent magnet 24 may be mounted to protrude from the first surface of the drive ring 18.

Figure 3:
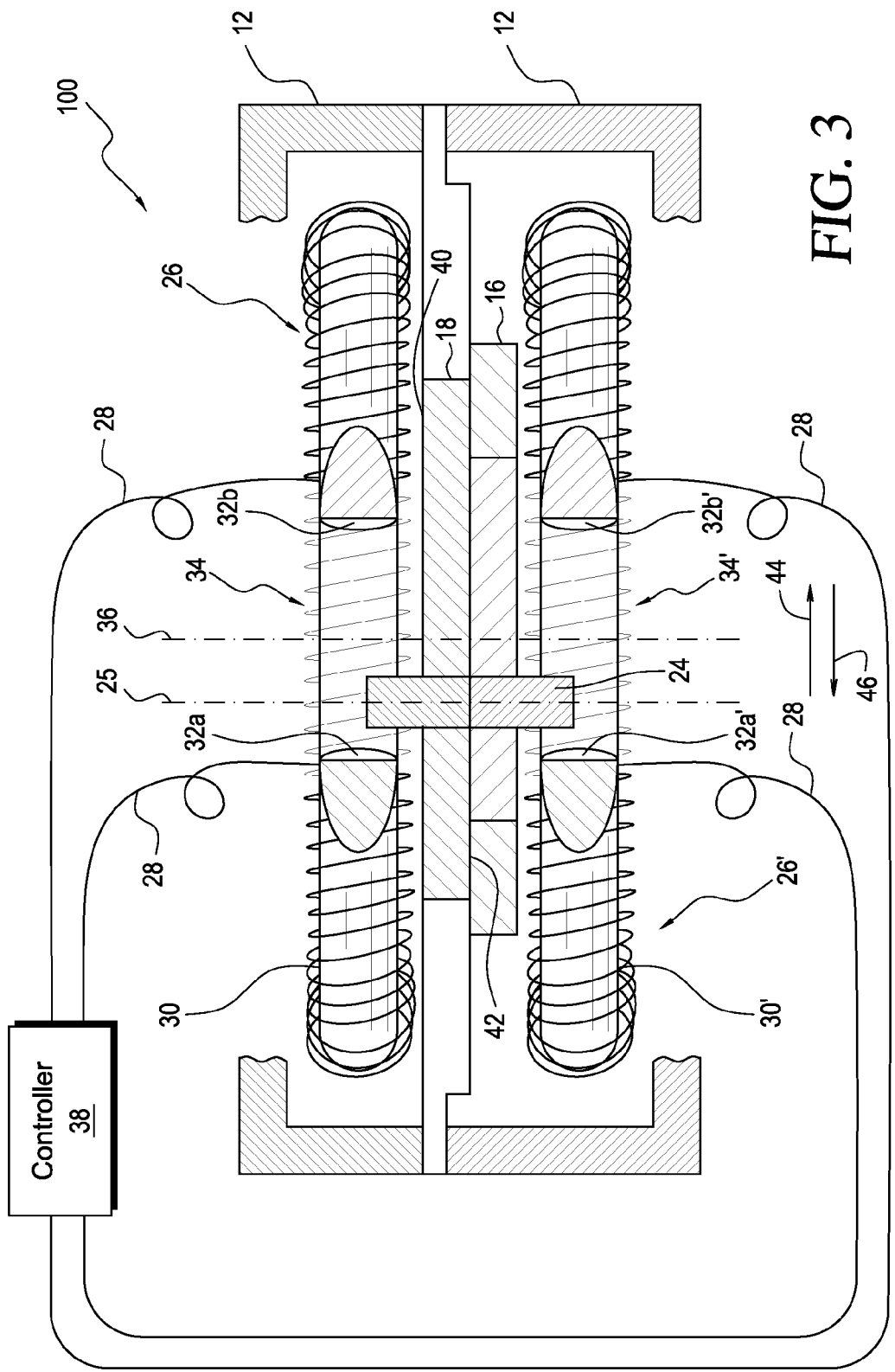
FIG. 3 is a cross-sectional view of a shutter, with portions removed, according to another exemplary embodiment of the present disclosure.

FIG. 3 illustrates an additional exemplary embodiment of the present disclosure. In this embodiment, two solenoids 26, 26' are provided in a shutter 100. The second solenoid 26' is substantially identical to the first solenoid 26, described above, and the two solenoids 26, 26' may be disposed proximate first 40 and second 42 oppositely-facing surfaces of the drive ring 18, respectively. Also in this embodiment, the permanent magnet 24 may be disposed through the drive ring 18, such that a first end of the magnet 24 is disposed in the gap 34 between operative faces 32a, 32b of the first solenoid 26 and a second end of the magnet 24 is disposed in the gap 34' between operative faces 32a', 32b' of the second solenoid 26'. The shutter 100 illustrated in FIG. 3 may function substantially similarly to the shutter 10 illustrated in FIGS. 1 and 2, and the presence of the second solenoid 26' may assist in providing additional force for the actuation of the permanent magnet 24. As a result, the exemplary embodiment illustrated in FIG. 3 may be utilized in applications in which the shutter component being actuated by the permanent magnet 24 requires a greater amount of force to move. Such embodiments may include those in which a large number of shutter blade 16 are used.

Figure 4:
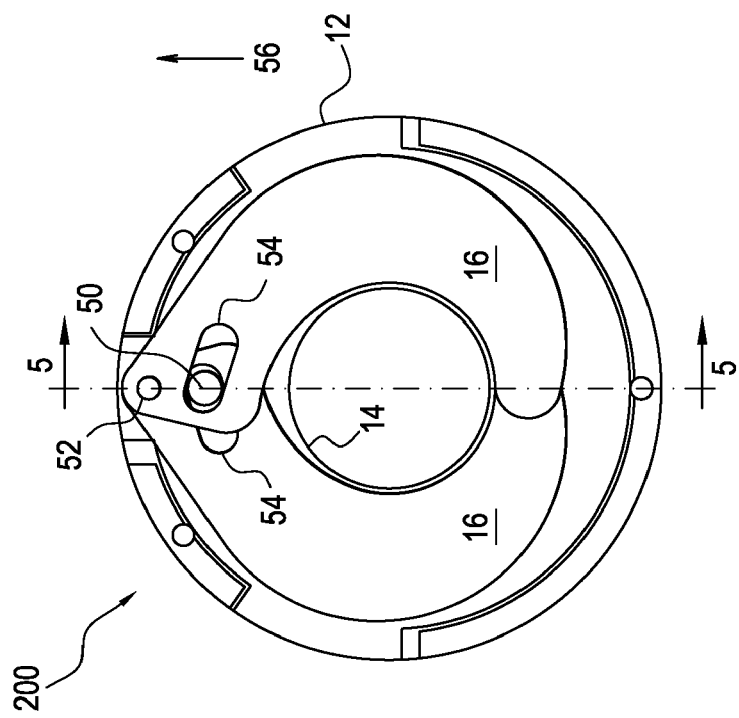
FIG. 4 is a plan view of a shutter, with portions removed, according to still another exemplary embodiment of the present disclosure.

FIG. 4 illustrates a shutter 200 according to yet another exemplary embodiment of the present disclosure. Where possible, like reference numbers have been used to describe the components of the shutter 200. Although not shown in FIG. 4, it is understood that the shutter 200 may also include a cover mounted to the base plate 12.

As shown in FIGS. 4 through 11, the shutter 200 can include a plurality of shutter blades 16 pivotally mounted and/or otherwise connected to a base plate 12. The shutter 200 can also include a magnet 50 such as, for example, a permanent magnet that is movably and/or otherwise connected to at least one of the shutter blades 16. The shutter 200 can also include a solenoid 26 defining a gap 34 between a first pole and a second pole. As will be described below, the solenoid 26 may be configured to controllably draw the magnet 50 into the gap 34 in a first state and to controllably repel the magnet 50 from the gap 34 in a second state. Such states may be defined by the respective polarities of poles defined by the solenoid 26. The solenoid 26 may also be configured so as to extend along and/or otherwise lie in a plane 62 substantially parallel to the plurality of shutter blades 16. The solenoid 26 may, thus, define a central axis 60 that is perpendicular to the plane 62.

The plurality of shutter blades 16 may be made from, for example, hardened aluminum, cold-rolled steel, stainless steel, titanium, and/or any other metal or alloy commonly used in shutters for photographic, scientific, or calibration applications. The shutter 200 may include any desirable number of shutter blades 16 known in the art. For example, although FIGS. 4 through 11 illustrate only two shutter blades 16, it is understood that the shutter 200 can include at least one shutter blade 16, or more than two shutter blades 16 depending upon the application in which the shutter 200 is being used. Accordingly, the shutter blades 16 can have any shape, size, and/or other configuration known in the art. The shutter blades 16 can be, for example half-moon shaped, teardrop shaped, substantially triangular, substantially square, substantially rectangular, and/or any other shape known in the art. The shutter blades 16 may preferably be as thin as possible so as to reduce a profile of the shutter 200. The shutter blades 16 may be pivotally, rotatably, and/or otherwise movably connected to the base plate 12 in anyway known in the art. For example, the shutter 200 may include a pin 52 fixedly attached to base plate 12, and each of the shutter blades 16 may be configured to rotate about the pin 52 between an open position (shown in FIG. 4) and a closed position (shown in FIG. 7). When in the open position, the shutter blades 16 may permit light to pass through the shutter opening 14 defined by the base plate 12. Likewise, when in the closed position, the shutter blades 16 may occlude light from passing through the shutter opening 14. It is understood that the shutter 200 may include additional pins 52, and each of the shutter blades 16 may be pivotally connected to at least one pin 52.

The base plate 12 of the shutter 200 may be substantially disc-shaped, substantially square, substantially rectangular, and/or any other shape known in the art. The base plate 12 may define one or more channels within which components of the shutter 200 may be disposed. For example, one or more channels of the base plate 12 may support, accept, and/or otherwise house the solenoid 26 and/or the magnet 50. The base plate 12 may be made from any metals, plastics, alloys, polymers, and/or other materials known in the art, and at least a portion of the base plate 12 may be made from a substantially non-magnetic metal or alloy. As discussed above with respect to the shutter blades 16, it may be desirable for the base plate 12 to be as thin as possible to as to minimize the overall dimensions of the shutter 200.

As shown in FIGS. 4 through 11, the magnet 50 may be movably connected to each shutter blade 16 of the plurality of shutter blades and may be movable within, for example, a channel defined by the base plate 12. As discussed above, the magnet 50 may be any type of magnet known in the art such as, for example, a permanent magnet having a north pole and a south pole. The magnet 50 may have any shape, size, and/or other configuration known in the art. For example, the magnet 50 may be sized and/or shaped to facilitate rapid movement of the shutter blades 16. As shown in at least FIGS. 5, 6, 8, and 9, the magnet 50 may define at least one knob 66 movably disposed within each slot 54 of the shutter blades 16. In an exemplary embodiment, the knob 66 may protrude from a top portion of the magnet 50 and the knob 66 may be substantially cylindrical in shape so as to reduce the friction created by movement of the knob 66 within the slots 54. As shown in FIGS. 10 and 11, in another exemplary embodiment, the knob 66 may be omitted and the magnet 50 itself may be substantially cylindrical. In such an embodiment, the magnet 50 may define a portion movably disposed within each slot 54, and the slots 54 may be sized and/or otherwise configured to move relative to the rounded portion of the magnet 50 disposed therein.

Figure 7:
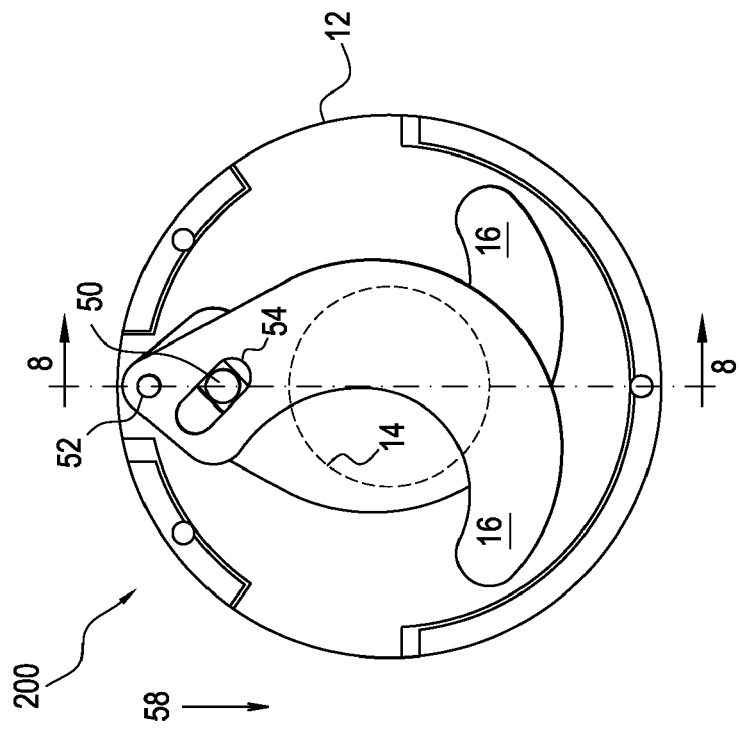
FIG. 7 is an additional view of the shutter illustrated in FIG. 4.

It is understood that the slots 54 may be shaped, sized, and/or otherwise configured to accept movement of any portion of the magnet 50 disposed therein. Accordingly, movement of a portion of the magnet 50, such as the knob 66, within the slots 54, may assist in transitioning the shutter blades 16 between the open position (FIG. 4) and the closed position (FIG. 7).

Figure 6:
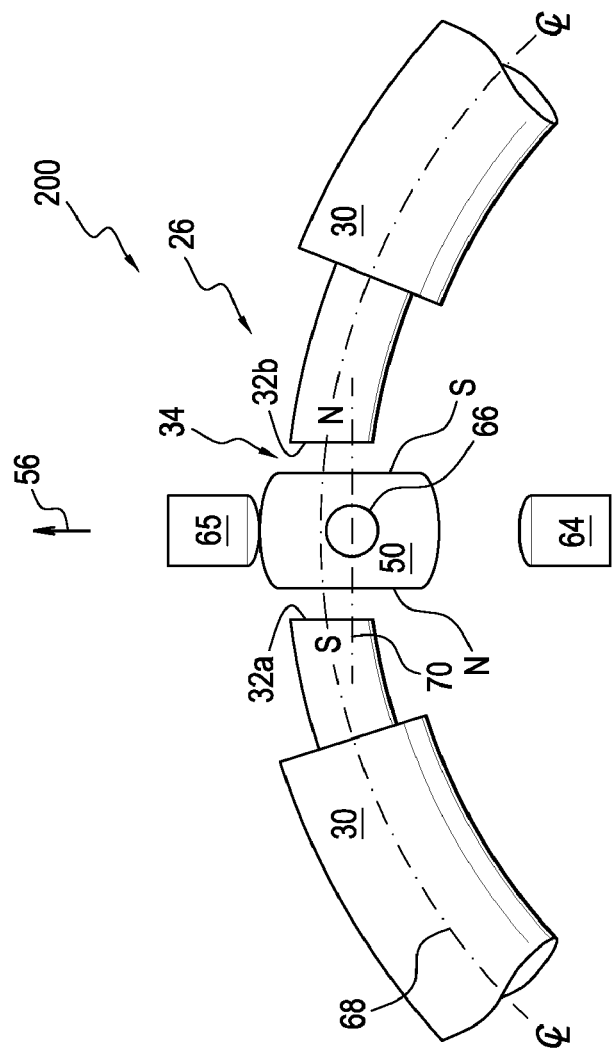
FIG. 6 shows a portion of the shutter illustrated in FIG. 4 with portions removed.
Figure 5:
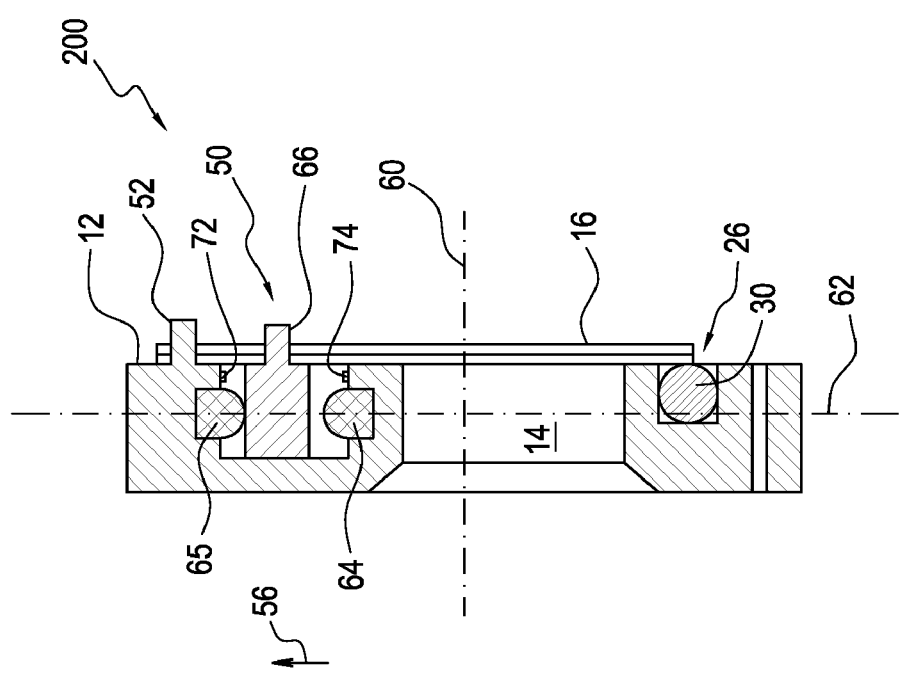
FIG. 5 is a cross-sectional view of the shutter of FIG. 4, as seen from section line 5-5 in FIG. 4.

As shown in at least FIGS. 6, 9, and 11, the magnet 50 may include a flat surface defining a north pole N and another flat surface defining a south pole S. The flat surfaces defining the poles N, S of the magnet 50 may be disposed adjacent to the operative faces 32a, 32b of the solenoid 26. The magnet 50 may also define a center line 70 passing through the midpoint and/or magnetic center of the north and south poles N, S. In an exemplary embodiment, the center line 70 may be substantially perpendicular to the flat surfaces of the magnet 50 defining the north pole N and the south pole S. In the embodiment shown in FIGS. 10 and 11, the slots 54 (not shown) may fit over the flat surfaces of the magnet 50 such that only the rounded portion of the magnet 50 contacts the shutter blades 16 to assist in the transition between the open and closed positions.

The magnet 50 may be configured to move in the direction of arrow 56 (FIGS. 4-6) to transition the shutter blades 16 into the open position, and the magnet 50 may be configured to move in the direction of arrow 58 (FIGS. 7-9) to transition the shutter blades 16 into the closed position. The shutter 200 may also include one or more stops 64, 65 configured to limit and/or restrict the movement of the magnet 50 in the direction of arrow 56 and arrow 58. The stops 64, 65 may be fixedly disposed within the base plate 12 and may be any structure known in the art configured to limit and/or restrict the movement of a movable structure disposed proximate thereto. The stops 64, 65 may be made from any dampening material known in the art such as, for example, rubber, plastics, and/or polymers. The stops 64, 65 may be non-brittle and may be configured to tolerate repeated impacts with one or more moving parts such as, for example, the magnet 50 of the shutter 200. In an exemplary embodiment, the stops 64, 65 may comprise one or more dampers configured to limit and/or otherwise restrict the travel of the magnet 50 relative to the gap 34. In such an exemplary embodiment, the stops 64, 65 may soften the impact of the magnet 50 as it transitions the shutter blades 16 between the open position and the closed position. The stops 64, 65 may have any shape, size, and/or other configuration known in the art configured to assist in dampening the impact of the magnet 50. For example, the stops 64, 65 may comprise one or more nylon set screws configured to dampen the magnet 50 upon impact therewith.

In an exemplary embodiment, the stops 64, 65 may be positioned within the base plate 12 so as to prohibit the north pole N and south pole S of the magnet 50 from moving into a position aligned with, for example, magnetic poles defined by the first and second operative faces 32a, 32b of the solenoid 26, respectively. In such an exemplary embodiment, the solenoid 26 and/or the core 30 may define a center line 68 passing through the magnetic center of the poles defined by the first and second operative faces 32a, 32b. The first and second operative faces 32a, 32b may have opposite polarities and the polarities of these poles may be controlled by the driver 38 (FIGS. 1-3). Accordingly, in such an exemplary embodiment, the stop 65 may be positioned to prohibit the magnetic poles N, S of the magnet 50 from moving into alignment with the magnetic poles defined by the operative faces 32a, 32b of the solenoid 26. In particular, as shown in FIGS. 6 and 11, the stop 65 may prohibit the center line 70 of the poles N, S of the magnet 50 from aligning with the center line 68 of the poles defined by the operative faces 32a, 32b, respectively. Thus, when the shutter blades 16 are in the open position, the permanent magnet 50 may be prohibited from fully entering the gap 34 and the magnetic center line 70 of the poles N, S of the magnet 50 may be prohibited from completely aligning with the magnet center line 68 of the poles defined by the operative faces 32a, 32b of the solenoid 26.

In addition, when the shutter blades 16 are in the closed position, the center line 70 may be even further out of alignment with the center line 68 as shown in FIG. 9. In addition, the flat surface of the magnet 50 defining the south pole S may be a distance $d_1$ from the operative face 32b of the solenoid 26, and the flat surface defining the north pole N of the magnet 50 may be a distance $d_2$ from the operative face 32a. As shown in FIG. 9, in an exemplary embodiment the distance $d_1$ may be substantially equivalent to the distance $d_2$ and the magnet 50 may remain substantially equidistant from the first and second operative faces 32a, 32b while the magnet 50 moves in the direction of arrows 56, 58.

The solenoid 26 may be substantially similar to the solenoid 26 discussed above with respect to FIGS. 1 through 3. In an exemplary embodiment, the solenoid 26 may have any shape, size, and/or other configuration known in the art. For example, the solenoid 26 may be substantially square, substantially rectangular, substantially C-shaped, and/or any other configuration capable of controllably delivering an electromagnetic charge. For example, as shown in FIGS. 4 through 11, the solenoid 26 may comprise a C-shaped core 30 defining a gap 34 between the first operative face 32a and the second operative face 32b. In addition, the first operative face 32a may face the second operative face 32b, and in such an embodiment, the electromagnetic flux lines of the solenoid 26 may travel substantially directly between the poles defined by the operative faces 32a, 32b.

As shown in FIGS. 1 through 3, the solenoid 26 may further comprise a coil of wire 28 wound around the core 30 and the wire 28 may be electrically connected to the driver 38. For ease of illustration, the coil of wire 28 and the driver 38 have been omitted from FIGS. 4 through 11. Although not illustrated in FIGS. 4 through 11, it is understood that the number of turns and/or the length of the wire 28 may define the electromagnetic strength of the poles defined by the operative faces 32a, 32b of the solenoid 26, and the greater the number of turns (i.e., the greater the length) of the coil 28, the more powerful the solenoid 26.

With such a coil configuration, the solenoid 26 may be operable using a much lower voltage than conventional electromagnets. In an exemplary embodiment, the solenoid 26 may provide a relatively large magnetic flux between the poles defined by the operative faces 32a, 32b with a relatively low voltage being supplied thereto. For example, the solenoid 26 may be operable utilizing less than 5 volts of electrical power and, in exemplary embodiments, the solenoid 26 may be operable utilizing less than 3 volts. Reducing and/or substantially minimizing the size of the gap 34 may assist in increasing the power of the solenoid 26. Thus, the distances $d_2$, $d_1$ between the poles N, S of the magnet 50 and the poles defined by the operative faces 32a, 32b of the solenoid 26 may be desirably as small as possible. In an exemplary embodiment, the distances $d_1$, $d_2$ may be equal to, approximately, 0.125" or less.

As discussed above, the magnet 50 may remain substantially equidistant from the first and second poles of the solenoid 26 as the magnet 50 is drawn into and repelled from the gap 34. The polarity of each pole of the solenoid 26 may be controllably reversed by the driver 38 to controllably draw the magnet 50 into the gap 34 in a first magnetic state and controllably repel the magnet 50 from the gap 34 in a second magnetic state. As shown in at least FIGS. 5, 8, and 10, the magnet 50 may be configured to travel along a substantially linear path, and the path of the magnet 50 may be substantially coplanar with the solenoid 26. The linear path of the magnet 50 may also be substantially perpendicular to a line, such as, for example, the centerline 68, connecting the poles defined by the operative faces 32a, 32b of the solenoid 26.

The central axis 60 of the solenoid 26 may be substantially parallel to the central axis 36 of the shutter opening 14 and, in an exemplary embodiment, the central axis 60 may be colinear with the central axis 36. Thus, as shown in FIGS. 5, 6, 10, and 11, the solenoid 26 may be configured to draw the magnet 50 into the gap 34 along the plane 62 in a direction perpendicular to the central axis 60 of the solenoid 26. Likewise, as shown in FIGS. 8 and 9, the solenoid 26 may be configured to repel the magnet 50 from the gap 34 along the plane 62 and perpendicular to the central axis 60.

In such an exemplary embodiment, the magnet 50 may travel along a linear path between the stops 64, 65, and this linear path may be substantially coplanar with the plane 62. Although not explicitly illustrated in FIGS. 4 through 11, it is understood that this linear path may be substantially defined by a channel and/or other structures or components of the base plate 12. For example, the stops 64, 65 may define at least a portion of the path. It is understood that the path traveled by the magnet 50 may extend transverse to the gap 34 defined by the solenoid 26. As will be described in greater detail below, the magnet 50 may be configured to move in the path in response to the polarities of the poles defined by the first and second operative faces 32a, 32b.

In an additional exemplary embodiment of the present disclosure, the shutter 200 may include one or more feedback sensors configured to assist in controlling the position of the magnet 50. The sensors 72, 74 (FIGS. 5, 8, and 10) may comprise any type of electromagnetic and/or position sensor known in the art. For example, the sensors 72, 74 may comprise a hall effect sensor and a portion of the hall effect sensor may be mounted proximate the magnet 50. Exemplary mounting locations may include positions above or below one or both of the stops 64, 65. Alternatively, the sensors 72, 74 may comprise a current sensor configured to sense the current traveling through the coil 28 of the solenoid 26. In the exemplary embodiments discussed above, the driver 38 may receive feedback signals produced by the one or more sensors 72, 74. The signals may be indicative of a change in current travelling through the solenoid 26 as a result of the position of the magnet 50 within the gap 34. The driver 38 may then alter the current directed to the solenoid 26 to control the position of the magnet 50 within and/or otherwise relative to the gap 34.

In still another embodiment, the sensors 72, 74 may comprise a micromagnet mounted to one or more of the shutter blades 16 and a corresponding transponder mounted to a stationary component of the shutter 200 to detect the relative position of the micromagnet. In still a further embodiment, the sensors 72, 74 may comprise a flag or other structure mounted to the magnet 50 and a corresponding sensor configured to detect the position of the flag. In such exemplary embodiments, the driver 38 may receive feedback from the one or more sensors 72, 74 based on the change in position of the sensor components. In each of the embodiments discussed above, the feedback received from the sensors 72, 74 may be utilized to detect and/or otherwise assist in controlling the position of the magnet 50, thereby controlling the position of the shutter blades 16.

In an exemplary embodiment of the present disclosure, the shutter 200 may be used to open and close shutter blades 16 in one or more photographic device applications. For example, the shutter 200 may be utilized to expose photographic film to light for a desired period of time, thereby forming an image on the film. In such an application, the shutter 200 may be a component utilized in a camera or other like photographic device. As explained with respect to the figures described above, the driver 38 may direct an electrical current to the solenoid 26 via the wire 28. The current directed to the solenoid 26 may form, for example, a north pole at the operative face 32a and a south pole at the operative face 32b, as shown in FIG. 9. In such an exemplary embodiment, the north pole N of the magnet 50 may be repelled by the north pole of the operative face 32a, and the south pole S of the magnet 50 may be repelled by the south pole defined by the operative face 32b. Thus, the magnet 50 may be at least partially repelled from the gap 34 and may be forced adjacent to the stop 64. Repelling the magnet 50 at least partially from the gap 34 may cause the plurality of shutter blades 16 to achieve the closed position illustrated in FIG. 7. In particular, controlling the operative faces 32a, 32b to have the polarities shown in FIG. 9 may repel the magnet 50 in the direction of arrow 58 such that the knob 66 of the magnet 50 may travel in the slots 54 defined by the shutter blades 16, in the direction of arrow 58, thereby closing the shutter blades 16. Each of the plurality of shutter blades 16 is movably connected to the pin 52 and, thus, movement of the magnet 50 in the direction of arrow 58 within the slot 54 may move the plurality of shutter blades 16 about the pin 52 to achieve the closed position illustrated in FIG. 7.

To transition the shutter 200 to the open position illustrated in FIG. 4, and thereby expose and/or otherwise open the shutter opening 14, the driver 38 may be controlled to reverse the polarity of the poles of the solenoid 26. In particular, the driver 38 may direct a current to the solenoid 26 defining a south pole at the operative face 32a and a north pole at the operative face 32b. The south pole defined by the operative face 32a may attract the north pole N of the magnet 50 and the north pole defined by the operative face 32b may attract the south pole S of the magnet 50. Accordingly, the magnet 50 may travel in the direction of arrow 56 and may be drawn into the gap 34. Movement of the magnet 50 into the gap 34 may be restricted by the stop 65. In particular, the stop 65 may prohibit the poles N, S of the magnet 50 from moving into a position aligned with the poles defined by the first and second operative faces 32a, 32b of the solenoid 26. As shown in at least FIGS. 6 and 11, the stop 65 may be positioned to prohibit the center line 70 of the poles N, S of the magnet 50 from aligning with the center line 68 of the solenoid 26.

Drawing the magnet 50 at least partially into the gap 34 defined by the first and second poles of the solenoid 26 causes the plurality of shutter blades 16 movably connected to the magnet 50 to achieve the open position illustrated in FIG. 4. In particular, the knob 66 of the magnet 50 may travel in the direction of arrow 56 within the slot 54 of the shutter blades 16 so as to substantially expose and/or otherwise open the shutter opening 14. Each of the shutter blades 16 may also pivot and/or otherwise move about the pin 52 when transitioning between the open and closed positions described herein.

As described above, in transitioning the shutter 200 between the open and closed positions, the magnet 50 may move in a path coplanar with the solenoid 26 and substantially perpendicular to the central axis 60 of the solenoid 26 in response to the polarities of the first and second poles of the solenoid 26. Because the poles N, S of the magnet 50 are prohibited from moving into a position aligned with the first and second poles of the solenoid 26 when the magnet 50 is drawn into the gap 34, simply reversing the polarity of the poles defined by the operative faces 32a, 32b of the solenoid 26 may provide ample electromagnetic force to effectively repel the magnet 50 from the gap 34. In an alternative embodiment in which the poles N, S of the magnet 50 were permitted to substantially align with the poles defined by the operative faces 32a, 32b, simply reversing the polarity of the poles defined by the operative faces 32a, 32b may not cause the magnet 50 to travel in the direction of either arrow 56 or arrow 58. In such an exemplary embodiment, an additional mechanism may be required to induce movement of the magnet 50 and/or the shutter blades 16.

Other embodiments of the disclosed shutter will be apparent to those skilled in the art from consideration of this specification. It is intended that this specification and examples be considered as exemplary only, with the true scope of the invention being indicated by the following claims.

The invention claimed is:

1. A shutter, comprising:
   at least one shutter blade;
   a magnet contacting the at least one shutter blade; and
   a curved solenoid defining a gap between a first pole and a second pole, the solenoid configured to controllably draw the magnet into the gap in a first state and to controllably repel the magnet from the gap in a second state.

2. The shutter of claim 1, wherein the magnet travels along a linear path coplanar with the solenoid and perpendicular to a line between the first and second poles of the solenoid.

3. The shutter of claim 1, wherein the solenoid lies in a plane substantially parallel to the at least one shutter blade and defines a central axis perpendicular to the plane, the solenoid configured to draw the magnet into the gap along the plane and perpendicular to the central axis.

4. The shutter of claim 1, wherein the solenoid comprises a C-shaped core and a coil of wire wound around the core.

5. The shutter of claim 1, wherein the first and second poles of the solenoid have opposite polarities.

6. The shutter of claim 1, further comprising a solenoid driver configured to energize the solenoid in at least one of the first and second states and to change the polarity of the first and second poles.

7. The shutter of claim 1, further comprising a stop positioned to prohibit first and second magnetic poles of the magnet from moving into a position aligned with the first and second poles of the solenoid, respectively.

8. The shutter of claim 1, wherein drawing the magnet into the gap moves the at least one shutter blade into an open position and repelling the magnet from the gap moves the at least one shutter blade into a closed position.

9. The shutter of claim 1, wherein the at least one shutter blade comprises a slot, and a portion of the magnet engages the slot.

10. The shutter of claim 9, wherein the at least one shutter blade is moveably connected to a pin, and movement of the magnet within the slot rotates the at least one shutter blade about the pin between an open position and a closed position.

11. The shutter of claim 1, wherein the magnet remains substantially equidistant from the first and second poles of the solenoid as the magnet is drawn into and repelled from the gap.

12. The shutter of claim 1, comprising a plurality of shutter blades.

13. The shutter of claim 1, further comprising a feedback sensor configured to assist in controlling the position of the magnet.

14. The shutter of claim 13, wherein the feedback sensor produces a feedback signal indicative of a change in current travelling through the solenoid.

15. A shutter, comprising:
    a moveable magnet;
    a plurality of shutter blades moveably connected to the magnet and moveable between an open position and a closed position; and
    a solenoid having a first face defining a first pole, and a second face facing the first face and defining a second pole,
    the solenoid lying in a plane substantially parallel to the plurality of shutter blades and defining a central axis perpendicular to the plane,
    the magnet configured to move in a path coplanar with the solenoid and substantially perpendicular to the central axis in response to a change in polarity of at least one of the first and second poles.

16. The shutter of claim 15, wherein the magnet remains substantially equidistant from the first and second poles of the solenoid during movement in the path.

17. The shutter of claim 15, wherein a portion of the path is defined by a damper.

18. The shutter of claim 15, further comprising a solenoid driver configured to change the polarity of the first and second poles.

19. The shutter of claim 15, further including a stop disposed in the path and configured to prevent a first and second pole of the magnet from moving into a position aligned with the first and second poles of the solenoid, respectively.

20. The shutter of claim 15, wherein the solenoid defines a gap between the first pole and the second pole, the path extending into and out of the gap.

21. The shutter of claim 15, wherein each of the plurality of shutter blades comprises a slot, and a portion of the magnet is moveably disposed within each slot.

22. The shutter of claim 21, wherein each of the plurality of shutter blades is moveably connected to a pin, and movement of the magnet within the slot rotates the plurality of shutter blades about the pin between the open and closed positions.

23. The shutter of claim 15, wherein the solenoid comprises a C-shaped core and a coil of wire wound around the core.

24. A method of controlling a shutter, comprising:
    drawing a portion of a magnet into a gap defined by first and second poles of a curved solenoid, wherein drawing the portion of the magnet into the gap causes a plurality of shutter blades contacting the magnet to move to an open position; and
    repelling the portion of the magnet from the gap, wherein repelling the portion of the magnet from the gap causes the plurality of shutter blades to move to a closed position.

25. The method of claim 24, wherein drawing the portion of the magnet into the gap comprises energizing the solenoid such that the first and second poles are oppositely polarized.

26. The method of claim 24, further including preventing first and second magnetic poles of the magnet from moving into a position aligned with the first and second poles of the solenoid, respectively.

27. The method of claim 24, wherein the solenoid lies in a plane substantially parallel to the plurality of shutter blades and defines a central axis perpendicular to the plane,
   drawing the portion of the magnet into the gap comprising guiding the magnet to travel along the plane and perpendicular to the central axis.

28. The method of claim 24, further including controlling a position of the magnet based on a feed-back signal indicative of a change in current traveling through the solenoid.

29. A shutter, comprising:
   a moveable magnet;
   at least one shutter blade moveably connected to the magnet; and
   a solenoid defining a gap between a first pole and a second pole, the solenoid configured to controllably draw the magnet into the gap in a first state and to controllably repel the magnet from the gap in a second state,
   wherein the magnet travels along a linear path coplanar with the solenoid and perpendicular to a line between the first and second poles of the solenoid.

30. A shutter, comprising:
   a moveable magnet;
   at least one shutter blade moveably connected to the magnet; and
   a solenoid defining a gap between a first pole and a second pole, the solenoid configured to controllably draw the magnet into the gap in a first state and to controllably repel the magnet from the gap in a second state,
   wherein the solenoid lies in a plane substantially parallel to the at least one shutter blade and defines a central axis perpendicular to the plane, the solenoid configured to draw the magnet into the gap along the plane and perpendicular to the central axis.

31. A shutter, comprising:
   a moveable magnet;
   at least one shutter blade moveably connected to the magnet; and
   a solenoid comprising a C-shaped core and a coil of wire wound around the core, the solenoid defining a gap between a first pole and a second pole, and configured to controllably draw the magnet into the gap in a first state and to controllably repel the magnet from the gap in a second state.

32. A shutter, comprising:
   a moveable magnet;
   at least one shutter blade moveably connected to the magnet;
   a solenoid defining a gap between a first pole and a second pole, the solenoid configured to controllably draw the magnet into the gap in a first state and to controllably repel the magnet from the gap in a second state; and
   a solenoid driver configured to energize the solenoid in at least one of the first and second states and to change the polarity of the first and second poles.

33. A shutter, comprising:
   a moveable magnet;
   at least one shutter blade moveably connected to the magnet;
   at least one shutter blade;
   a solenoid defining a gap between a first pole and a second pole, the solenoid configured to controllably draw the magnet into the gap in a first state and to controllably repel the magnet from the gap in a second state; and
   a feedback sensor configured to assist in controlling the position of the magnet.

34. The shutter of claim 33, wherein the feedback sensor produces a feedback signal indicative of a change in current travelling through the solenoid.

35. A method of controlling a shutter, comprising:
   drawing a portion of a magnet into a gap defined by first and second poles of a solenoid, wherein drawing the portion of the magnet into the gap causes a plurality of shutter blades moveably connected to the magnet to move to an open position; and
   repelling the portion of the magnet from the gap, wherein repelling the portion of the magnet from the gap causes the plurality of shutter blades to move to a closed position,
      wherein the solenoid lies in a plane substantially parallel to the plurality of shutter blades and defines a central axis perpendicular to the plane, and
      wherein drawing the portion of the magnet into the gap comprises guiding the magnet to travel along the plane and perpendicular to the central axis.

36. A method of controlling a shutter, comprising:
   drawing a portion of a magnet into a gap defined by first and second poles of a solenoid, wherein drawing the portion of the magnet into the gap causes a plurality of shutter blades moveably connected to the magnet to move to an open position;
   repelling the portion of the magnet from the gap, wherein repelling the portion of the magnet from the gap causes the plurality of shutter blades to move to a closed position; and
   controlling a position of the magnet based on a feed-back signal indicative of a change in current traveling through the solenoid.

37. A shutter, comprising:
   at least one shutter blade having a slot;
   a one-piece magnet having a knob engaging the slot; and
   a solenoid defining a gap between a first pole and a second pole, the solenoid configured to controllably draw the magnet into the gap in a first state and to controllably repel the magnet from the gap in a second state.

38. A shutter, comprising:
   at least one shutter blade;
   a magnet having a portion extending through the at least one shutter blade; and
   a solenoid defining a gap between a first pole and a second pole, the solenoid configured to controllably draw the magnet into the gap in a first state and to controllably repel the magnet from the gap in a second state.

39. A shutter, comprising:
   at least one shutter blade;
   a magnet, the at least one shutter blade, and the magnet being slidably engaged with each other; and
   a solenoid defining a gap between a first pole and a second pole, the solenoid configured to controllably draw the magnet into the gap in a first state and to controllably repel the magnet from the gap in a second state.

40. A shutter, comprising:
   at least one shutter blade;
   a magnet contacting the at least one shutter blade; and
   a curved solenoid defining a gap between a first pole and a second pole facing the first pole, the solenoid configured to controllably draw the magnet into the gap in a first state and to controllably repel the magnet from the gap in a second state.

41. A shutter, comprising:
   at least one shutter blade;
   a magnet contacting the at least one shutter blade; and a solenoid comprising a first face defining a first pole, a second face defining a second pole, and a gap between the first pole and the second pole, the solenoid configured to controllably draw the magnet into the gap in a first state and to controllably repel the magnet from the gap in a second state;

the magnet traveling along a linear path substantially parallel to the first and second poles of the solenoid.

42. A method of controlling a shutter, comprising:

drawing a portion of a magnet into a gap defined by first and second poles of a solenoid, wherein drawing the portion of the magnet into the gap causes a plurality of shutter blades contacting the magnet to move to an open position; and repelling the portion of the magnet from the gap, wherein repelling the portion of the magnet from the gap causes the plurality of shutter blades to move to a closed position, wherein at least one of drawing the portion of the magnet into the gap and repelling the portion of the magnet from the gap comprises moving the magnet along a path substantially parallel to the first and second poles of the solenoid, wherein the first and second poles are defined by opposing faces of the solenoid.

43. A method of controlling a shutter, comprising:

drawing a portion of a magnet into a gap defined by first and second poles of a solenoid, wherein drawing the portion of the magnet into the gap causes a plurality of shutter blades contacting the magnet to move to an open position, the plurality of shutter blades and the magnet being slidably engaged with each other; and repelling the portion of the magnet from the gap, wherein repelling the portion of the magnet from the gap causes the plurality of shutter blades to move to a closed position.

44. A method of controlling a shutter, comprising:

drawing a portion of a magnet into a gap defined by first and second poles of a solenoid, wherein drawing the portion of the magnet into the gap causes a plurality of shutter blades contacting the magnet to move to an open position, the magnet extending through at least one shutter blade of the plurality of shutter blades; and repelling the portion of the magnet from the gap, wherein repelling the portion of the magnet from the gap causes the plurality of shutter blades to move to a closed position.

45. A method of controlling a shutter, comprising:

drawing a portion of a magnet into a gap defined by first and second poles of a solenoid, wherein drawing the portion of the magnet into the gap causes a plurality of shutter blades contacting the magnet to move to an open position, the magnet comprising a one-piece magnet defining a knob, and each shutter blade of the plurality of shutter blades comprising a slot, the knob engaging each slot; and repelling the portion of the magnet from the gap, wherein repelling the portion of the magnet from the gap causes the plurality of shutter blades to move to a closed position.

* * * * *